May 2, 1933.  W. O. WESTERDAHL  1,907,418
MOTION REVERSING MEANS
Filed March 13, 1931   2 Sheets-Sheet 1
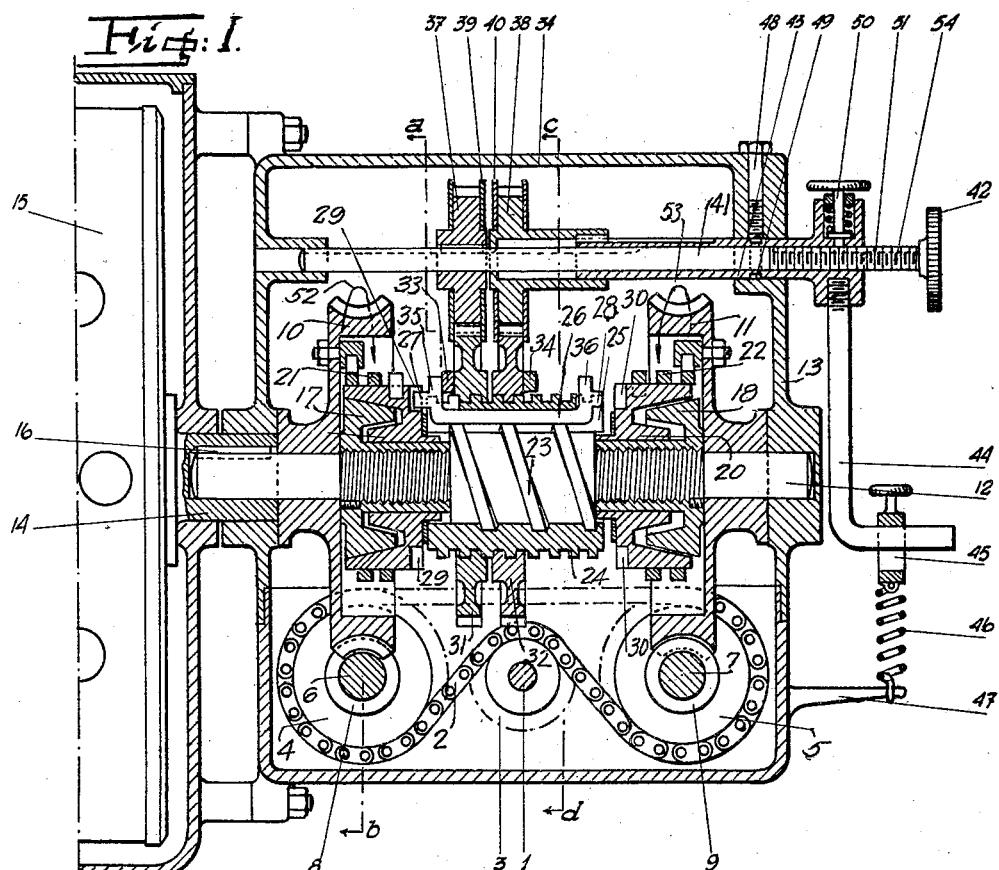
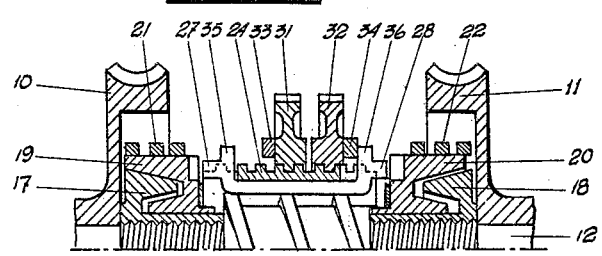
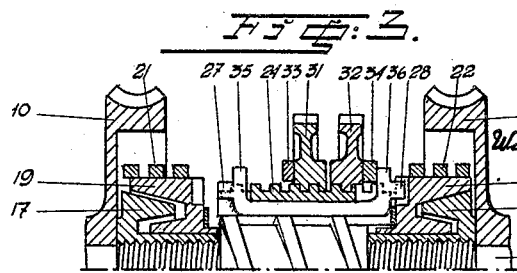

May 2, 1933.    W. O. WESTERDAHL    1,907,418
MOTION REVERSING MEANS
Filed March 13, 1931    2 Sheets-Sheet 2 a-b c-d

Patented May 2, 1933

1,907,418

UNITED STATES PATENT OFFICE

WILHELM OTTO WESTERDAHL, OF STOCKHOLM, SWEDEN

MOTION-REVERSING MEANS

Application filed March 13, 1931, Serial No. 522,402, and in Sweden November 19, 1928.

The present invention relates to an arrangement adapted for reversing the movement of a rotary container, for example, which is to be caused alternately to rotate in opposite directions.

The invention is principally characterized by the fact that two gear wheels adapted to transmit the movement onto the container or the like are arranged to be driven continuously in opposite directions, said gear wheels being carried by a shaft on which a sleeve is adapted to be screwed to and fro in such a manner as to be brought into such connection with the one or the other gear wheel, when screwed alternately in the one or the other direction, that the sleeve is entrained in the rotation of the wheel so as to carry the shaft along in the same rotation. Screwing of the sleeve in the one or the other direction is effected by the sleeve being provided with threads externally and by one or more runners being adapted to be screwed to and fro on the external threads of the sleeve, said runner or runners being in their extreme positions brought into engagement with the sleeve in such a manner that the latter is prevented from rotating and is thus caused to be screwed along the shaft from the one extreme position to the other.

The arrangement may be constructed so that the sleeve will, by the screwing motion, be pressed so powerfully against one of the gear wheels that the sleeve is thus entrained by the wheel directly. It is preferable, however, to provide a coupling between the shaft and each gear wheel, said coupling being so devised that, when the sleeve actuates the coupling in the screwing motion, the said coupling will connect the shaft to the gear wheel.

The accompanying drawings illustrate an embodiment of the invention by way of example.

Fig. 1 shows the reversing means in longitudinal section.

Fig. 2 shows a vertical longitudinal section of the two oppositely rotatable gear wheels with appertaining couplings and with a sleeve adapted to be screwed to and fro between the couplings and taking an intermediate position in this figure.

Fig. 3 shows the same arrangement with the sleeve screwed into an extreme position opposite to that shown in Fig. 1.

Figure 4:
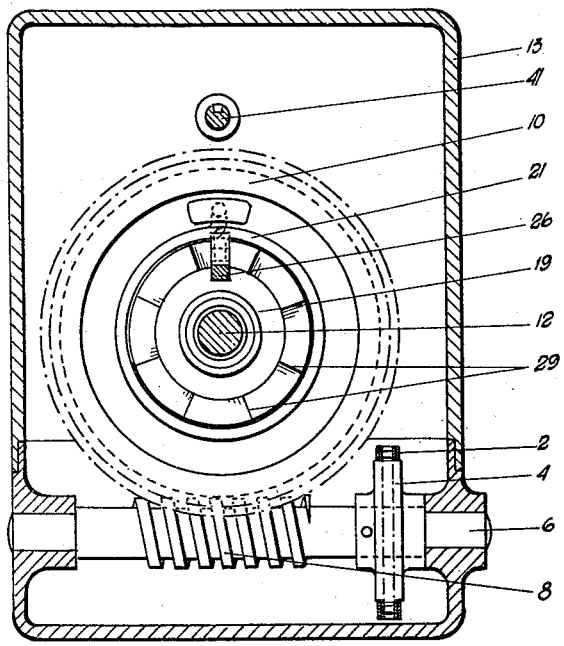
Fig. 4 shows a vertical cross-section on line a—b in Fig. 1.
Figure 5:
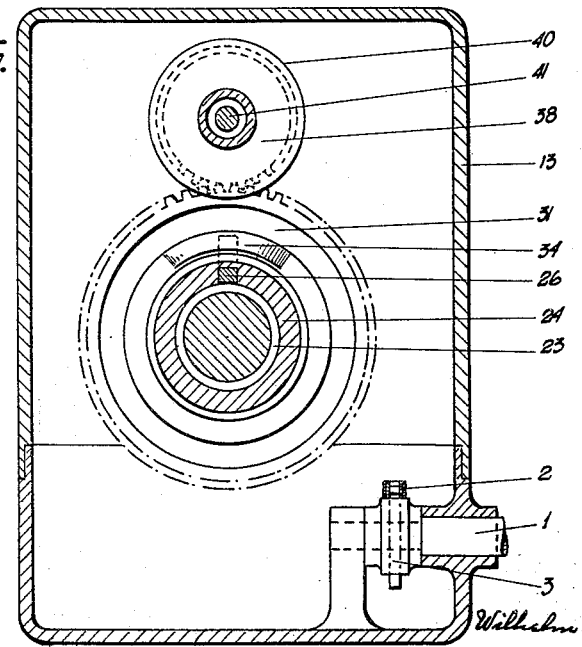
Fig. 5 shows a vertical cross-section on line c—d in Fig. 1.

1 is a driving shaft which may be directly connected to a motor. Through the chain 2, which engages a sprocket wheel 3 secured on the shaft 1, movement is transmitted onto two sprocket wheels 4 and 5 attached to shafts 6 and 7 in operative conection with the worm wheels 10 and 11 through worms 8 and 9 respectively. The worm wheels 10 and 11, which are cut with opposite pitches, are thus caused to rotate in opposite directions. Both wheels 10 and 11 are mounted to run freely on the shaft 12. This shaft is mounted with its one end in the casing 13 and is secured with its opposite end in the sleeve-like pivot 14 of the drum 15, the rotary movement of which is to be reversed. The shaft 12 is secured within the pivot 14 by means of the key 16. Rigidly screwed onto the shaft 12 are the coupling members 17 and 18 corresponding each to one of the gear wheels 10 and 11 respectively. The coupling member 19 is displaceable and rotatable to a certain extent on the neck of the coupling member 17, and similarly the neck of the member 18 has the coupling member 20 displaceably and rotatably arranged thereon. The coupling members 19 and 20 are connected with the gear wheels 10 and 11 through the torsion springs 21 and 22 respectively. The central portion of the shaft 12 is formed into a screw 23 of great pitch. Adapted to be screwed to and fro on this screw is a sleeve 24. The sleeve 24 has a slot 25 provided longitudinally thereof, said slot being open toward the ends and having a bolt 26 displaceable to and fro therein. The end portions of the bolt are formed into abutments 27 and 28 adapted to be brought into engagement with teeth 29 and 30 respectively on the coupling members 19 and 20. The sleeve 24 is provided with internal threads, and two gear wheels 31 and 32 are adapted to be screwed on these threads. Said gear wheels are provided with cams 33 and 34 cooperating with abutments 35 and 36 on the bolt 26.

Pinions 37 and 38 engage into the gear wheels 31 and 32. Said pinions are provided with flanges 39 and 40, between which the gear wheels 31 and 32 enter, as shown in Fig. 1. The flanges 39 and 40 prevent an axial displacement of the gear wheels 31 and 32 and of the pinions 37 and 38 relatively to each other. The pinion 37 is displaceable but not rotatable on the shaft 41 which may be turned manually by means of the hand wheel 42, and the pinion 38 is displaceable but not rotatable on the pipe-shaped part 43 which may be turned manually by means of the crank 44. In the operation of the apparatus the crank 44 is retained by the strap 45 which is connected by means of the spring 46 to an arm 47 projecting from the casing 13. The pipe-shaped part 43 is prevented from axial displacement by means of the screw 48 which enters a slot 49 extending around the shaft. The shaft 41 is prevented from turning unintentionally by means of the resilient latch 50 entering a slot 51 provided in the shaft 41 longitudinally thereof. The shaft 41 is provided with threads 54 engaging corresponding threads in the pipe-shaped part 43. By pulling the strap 45 out of engagement with the crank 44 the latter will be free to be rotated. This taking place, the pinion 38 turns so as to also turn the gear wheel 32, so that the latter is screwed on the sleeve 24, whereby the distance between the gear wheels 37 and 38 is altered. In a similar manner the gear wheel 31 may be turned by releasing the latch 50 and by then turning the pinion 37 by means of the wheel 42, so that the pinion 37 will turn the gear wheel 31 so that the latter is displaced in such manner that the axial distance between the gear wheels 31 and 32 is altered. The arrangement last described and the object thereof will be described more fully in the following.

The arrangement in its entirety operates in the following manner.

As already set forth hereinbefore the gear wheels 10 and 11 rotate in opposite directions. When viewed from the right in Fig. 1 the wheel 10 rotates clockwise as indicated by the arrow 52, the wheel 11 rotating counter-clockwise according to the arrow 53. The sleeve 24 occupies its left extreme position and keeps the coupling member 19 in engagement with the coupling member 17. The coupling member 17 being secured on the shaft 12 and the coupling member 19 being connected with the wheel 10 by means of the spring 21, the shaft 12 with the drum 15 will consequently be entrained in the clockwise rotation. According to Fig. 1, the latch 26 of the sleeve 24 is, furthermore, moved into its left extreme position, and is then in engagement with one of the teeth 29 of the coupling member 19 by means of the abutment 27 of the sleeve 24, so that the latter is locked to the coupling member 19 so as to take part in the above mentioned clockwise rotation. According to Fig. 1, the gear wheels 31 and 32 are also in their left extreme position, the gear wheel 31 then bearing with its cam 33 against the abutment 35 of the latch 26. The gear wheels 31 and 32 cannot rotate during the operation of the apparatus, inasmuch as they are in engagement with the pinions 37 and 38 which are both locked against rotation, the one 37 by means of the resilient latch 50 and the other 38 by means of the crank 44 which is retained by the strap 45.

Assuming that the parts occupy the mutual positions herein last described, according to Fig. 1, and that the shaft 12 with the drum 15 and the sleeve 24 thus rotate clockwise as indicated by the arrow 52, the non-rotatable gear-wheels 31 and 32 will thus screw themselves toward the right on the sleeve 24 during this rotary movement. When such screwing has been continued so far that the cam 34 of the gear wheel 32 has been brought into the path of the abutment 36 of the latch 26, the sleeve 24 will be displaced to the right under the influence of the abutment 36, so as to take the intermediate position shown in Fig. 2. In this position, the latch 26 with its abutment 27 and thus also the sleeve 24 is released from engagement with the coupling member 19. The sleeve 24, which for this reason does not now take part in the rotation, will thus screw itself to the right on the screw 23 coherent with the shaft 12. As soon as the sleeve 24 is then removed from the coupling member 19, the latter will be released from the coupling member 17, actuated axially by means of the spring 21. The drum 15 together with the shaft 12 with the screw 23 still continue to rotate clockwise by reason of the inertia of the drum 15, the screwing of the sleeve 24 to the right on the screw 23 being then continued, until the sleeve 24 hits the coupling member 20 to move the latter into engagement with the coupling member 18. The latch 26 with its abutment 28 is then brought into engagement with either one of the teeth 30 of the coupling member 20 (see Fig. 3). The shaft 12 with the drum 15 and the sleeve 24 are then engaged so as to be carried along in the counter-clockwise rotation of the wheel 11, according to the arrow 53, that is to say, their movement is reversed. At the commencement of this new movement the gear wheels 31 and 32 screw themselves back to the left on the sleeve rotating counter-clockwise and the cycle of operation is repeated to effect reengagement with the wheel 10, and so forth, to and fro. In order that the sleeve 24 shall remain stationary when the latch 26 has been displaced out of engagement with the coupling member 19, the sleeve may be provided with a boss adapted when released to be brought into engagement with an abutment on the cam 33. A similar arrangement must then, of course, be provided for the cam 34.

Inasmuch as the screwing of the gear wheels 37 and 38 to and fro on the sleeve 34 determines the release of the latch 26 from the one or the other extreme position, the number of revolutions of the drum 15 in the one or the other direction will be dependent on the distance by which the gear wheels 37, 38 have to move, in order that the cam 33 or 34 of either wheel shall be brought into the path of the boss 27 or 28 of the latch 26 in the manner above described. This distance is regulated by altering the distance between the gear wheels 37 and 38, which, as has been previously described, is effected by rotating either the hand wheel 42 or the crank 44 after their respective locking members 50 or 45 have been released. From this it follows that the nearer the gear wheels 31 and 32 are adjusted onto each other the greater will be the number of revolutions of the drum 15 in the one or the other direction and, vice versa, the number of revolutions will be the smaller the greater the distance be adjusted between the gear wheels 31 and 32.

What I claim is:—

1. Reversing gear comprising, in combination, a pair of gear wheels, means for continuously driving said gear wheels in opposite directions, a shaft carrying said gear wheels and having a threaded portion, a sleeve threaded on the threaded portion of said shaft for movement along said shaft, a pair of clutches mounted on said shaft for selectively coupling said shaft to said gear wheels, a latch member axially displaceable on said shaft, and movable into engagement with one of said clutches to actuate the same and simultaneously to connect said sleeve to said clutch, and means active upon the continued rotation of said shaft for moving said latch into engagement with said clutches alternately.

2. The invention as set forth in claim 1, wherein said last means comprises a pair of members threaded on said sleeve for axial movement thereon and arranged to bear alternately against opposite ends of said latch as the sleeve is rotated to move the latch into engagement with the clutches alternately.

3. The invention as set forth in claim 1, wherein said last means includes a pair of gears mounted on said sleeve and arranged to bear alternately against the opposite ends of said latch and means to lock said gears against rotation.

4. The invention as set forth in claim 1, wherein said last means includes a pair of trip members movable on said sleeve for alternate engagement with said latch member, a pair of spacing members engaging said trip members, means mounting said spacing members for movement parallel to said shaft and means for adjusting the position of said spacing members relative to one another.

WILHELM OTTO WESTERDAHL.